March 10, 1970 L. J. KINKEL ET AL 3,500,317

MULTIFREQUENCY PULSE-ENCODED MODULATION SYSTEM

Filed Dec. 30, 1968 2 Sheets-Sheet 1

INVENTORS
LESTER J. KINKEL
ROBERT P. McMANUS
BY
ATTORNEYS

| OCTAL CODE |
|---|
| 7 |
| 3 |
| 1 |
| 4 |
| 2 |
| 5 |
| 6 |

| CODE DESIGNATOR $2^2$ | $2^1$ | $2^0$ |
|---|---|---|
| 1 | 1 | 1 |
| 0 | 1 | 1 |
| 0 | 0 | 1 |
| 1 | 0 | 0 |
| 0 | 1 | 0 |
| 1 | 0 | 1 |
| 1 | 1 | 0 |

GENERATED POLYNOMIAL DEVELOPED OVER SHIFTING TIMES $t_0 - t_6$

| $t_0$ | $t_1$ | $t_2$ | $t_3$ | $t_4$ | $t_5$ | $t_6$ |
|---|---|---|---|---|---|---|
| 1 | 1 | 1 | 0 | 0 | 1 | 0 |
| 1 | 1 | 0 | 0 | 1 | 0 | 1 |
| 1 | 0 | 0 | 1 | 0 | 1 | 1 |
| 0 | 0 | 1 | 0 | 1 | 1 | 1 |
| 0 | 1 | 0 | 1 | 1 | 1 | 0 |
| 1 | 0 | 1 | 1 | 1 | 0 | 0 |
| 0 | 1 | 1 | 1 | 0 | 0 | 1 |

| | | | | | | | |
|---|---|---|---|---|---|---|---|
| 1 | 1 | 1 | 0 | 0 | 1 | 0 | |
| 0 | 0 | 1 | 0 | 1 | 1 | 1 | |
| 1 | 1 | | | 1 | | 1 | =4 DISTINGUISHABLE CODE ELEMENTS |

INVENTORS
LESTER J. KINKEL
ROBERT P. McMANUS
BY
[signatures]
ATTORNEYS

United States Patent Office 3,500,317

Patented Mar. 10, 1970

3,500,317

MULTIFREQUENCY PULSE-ENCODED MODULATION SYSTEM

Lester J. Kinkel and Robert P. McManus, San Diego, Calif., assignors to the United States of America as represented by the Secretary of the Navy Filed Dec. 30, 1965, Ser. No. 517,867
Int. Cl. G06f *11/00;* G08d *29/00;* G08c *1/00*
U.S. Cl. 340—146.1 6 Claims

ABSTRACT OF THE DISCLOSURE

A multi-frequency, pulse encoded modulation system capable of encoding a transmission signal with code sequences which are so conceived and generated as to be readily distinguishable from each other at the point of reception even though one or more of the discrete code elements which comprise a particular code sequence may have been attenuated or lost in transmission. The encoded transmissions are made at each of a plurality of preselected frequencies to determine the relative desirability of transmission characteristics of the frequencies.

STATEMENT OF GOVERNMENT INTEREST

The invention described herein may be manufactured and used by or for the Government of the United States of America for governmental purposes without the payment of any royalties thereon or therefor.

The present modulation system is especially useful in connection with the transmission of intelligence by encoded pulse means over a long distance high frequency communication system supported by layers of ionized particles in the earth's upper atmosphere commonly referred to as the ionosphere.

The influence of the intense radiation energy from the sun ionizes particles in the earth's upper atmosphere in sufficient quantities to form discrete charged layers above the earth's surface. These layers are commonly referred to as E, $F_1$ and $F_2$ and are located at approximately 100, 200 and 300 kilometers above the earth's surface, respectively. Diurnal, solar and seasonal variations of the earth relative to the sun not only cause layer density and height differences of these layers but during disturbed conditions can form new layers or cause absorption of radiated signal energy in the high frequency spectrum. As a result, these dynamic changes can detrimentally affect certain of the frequencies otherwise capable of supporting a long distance communication path by oblique incidence reflection from the ionosphere.

Consequently, if intelligence is to be communicated over a high frequency path comprising at least one transmitting and one receiving station, a modulation system should be employed having maximum recognizability as to the intelligence contained in such modulation, especially if the transmitted intelligence is directed over a path about which interference, attenuation and absorption conditions are not immediately known.

Accordingly, it is a principal object of the present invention to provide a modulation system for encoding transmission signals in any of a plurality of code sequences so that each code sequence has the maximum recognizability with respect to the other code sequences.

A further object of the present invention is to provide such a modulation system including means for encoding transmission signals in any code sequence of a plurality of sequences, each of which comprises a like number of code elements spaced over a like number of time elements and having a maximum number of distinguishable code elements for the same respective time elements.

Another object of the present invention is to provide such a modulation system including an encoding means having the maximum number of such distinguishable code elements as a function of the total number of code elements common to a plurality of such sequences.

Yet another object of the present invention is to provide a modulation system including a code designator means for developing a plurality of code designator signals in a selectively determinable order.

A further object of the present invention is to provide a modulation system including multiple sources of selectable code designator signals.

The present invention comprises a modulation system having a means for developing a plurality of code designator signals in a selectively determinable order. Such code designator signals may consist of three pulse groups representing an octal code in the form of a pulse of electrical energy for each of three pulse time elements or the absence of such a pulse in any one or more of the three pulse time elements. The source for developing such a plurality of code designator signals may comprise groups of simple toggle switches arranged and connected to provide a binary "1" or "0" output from each switch in accordance with its position. Alternatively, a solid state memory bank may be employed, as well as any storage device which is compatible with the requirements of deriving a means of developing selectively determinable code designator signals.

A code generator is connected to receive the code designator signals as an input and is adapted to be responsive thereto for generating commensurate polynomial code sequences in accordance with the received code designator input signals. It has been found that a binary shift register operates satisfactorily as a code generator for developing such polynomial code sequences. In one embodiment of the present invention octal code designator signals in the form of three time spaced pulse elements are impressed upon a code generator which may take the form of a binary shift register. The shift register operates upon the input signals by a series of shift pulses from time $t_0$ through $t_6$ to generate polynomial code sequences having seven pulse time code elements, each such sequence having a characteristic distinguishable from each other sequence and developed in response to and commensurate with its related code designator input signal.

A further most important aspect of the present inventive concept is that typical polynomial code sequences developed as described above each have four elements which are readily distinguishable from the four elements in like time code elements of each other code sequence; in other words, out of seven code elements, four such elements are readily distinguishable from each other code sequence in the plurality of code sequences developed in accordance with the concept of the present invention. Thus, the recognizability of any particular polynomial code sequence is maximized as a function of the total number of code elements common to such code sequences. This relationship and other features, advantages and objects of the present invention will be understood more fully from the description of several embodiments which follows, together with the illustrations and the drawings and the scope of the invention will be pointed out in the appended claims.

In the drawings:

FIG. 2 is a schematic illustration of one type of polynomial generator which may be employed with the present invention;

FIGS. 3, 3A, 3B and 3C are tables illustrating typical development of polynomial code sequences in accordance with the concept of the present invention;

FIG. 3D is a tabular illustration of the plurality of distinguishable elements generated between two polynomial code sequences.

In a typical application the present invention may be employed to modulate the transmissions in a sounder system. Sounder systems are employed to test and develop information as to the transmitting capabilities or the lack of transmitting capability of a group of frequencies employed for high frequency, long range communications. Such sounding techniques allow the observer to qualitatively select a frequency or frequencies that will support communications between two or more remote points of interest. Thus, a typical sounder system is employed to develop quantitative information concerning interference, absorption and attenuation of a selected frequency to assess path stability and aid in the selection of a desirable frequency for communication purposes. Typically, such sounder systems may employ time-spaced pulse signals stepped through a spectrum of frequencies which it is desired to inspect for desirable path stability and consequent reliability of communications.

Figure 1:
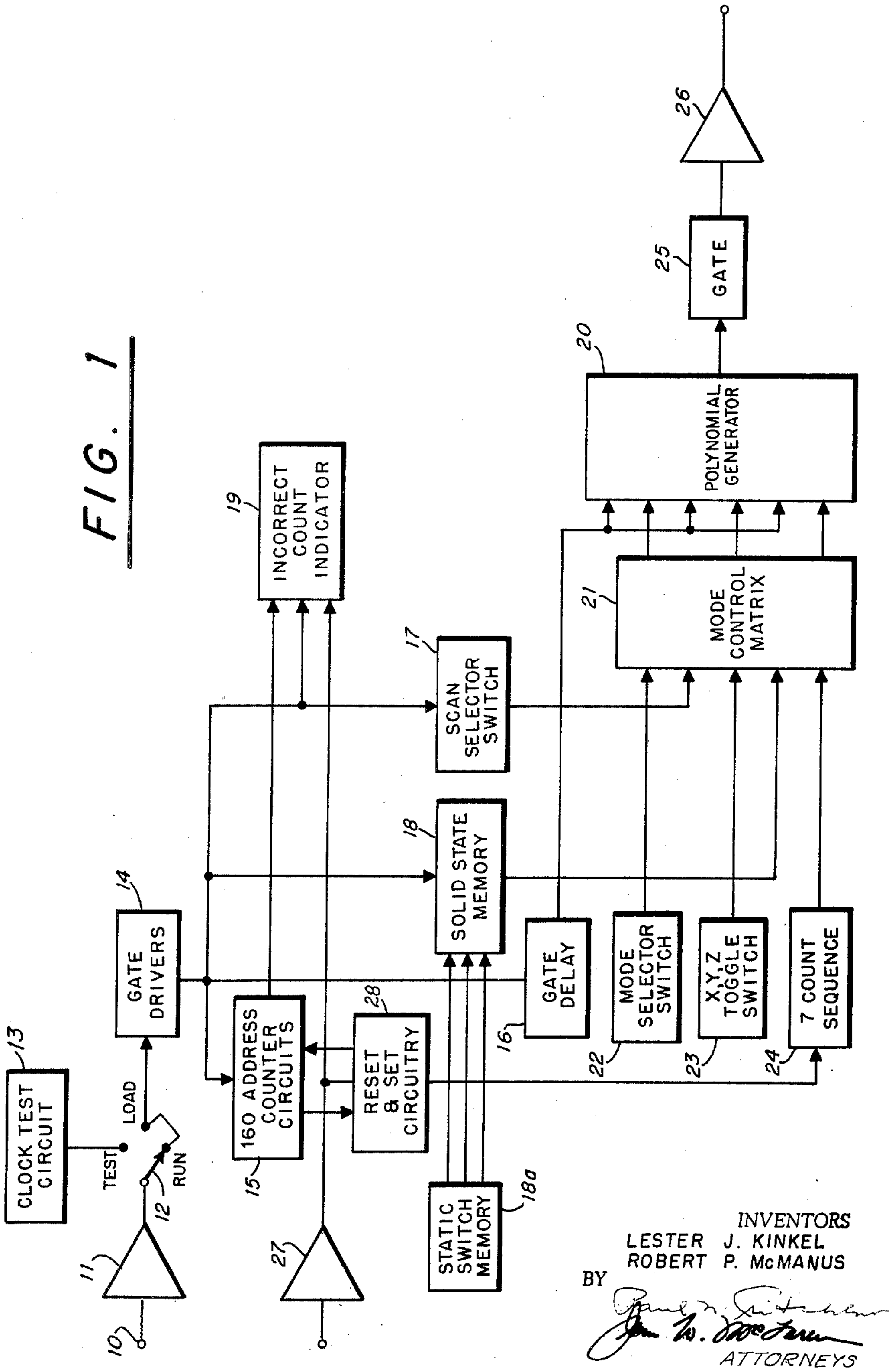
FIG. 1 is a schematic illustration of one embodiment of the present invention.

The embodiment of the present invention schematically illustrated in FIG. 1 is designed to be employed with such a sounder system and an input terminal 10 receives pulses which are amplified in a suitable amplifying means 11 and connected through a switch 12 so as to be selectively directed to "run," "load," or "test" contacts. The switch 12 is shown in the "run" position and as will be apparent to those skilled in the art, the switch means provides a convenient manner of connecting the input pulses to clock test circuits 13 which are customarily included in such equipment but form no part of the present invention.

The repetitive pulses received at the input terminal 10, after amplification, are connected through the switch 12 in its "run" position to gate drivers 14 which, in turn, are connected to a one hundred and sixty address counter circuit 15, a gate delay one-shot 16, a scan selector switch 17, a solid state memory 18, and an incorrect count indicator 19. The gate delay one-shot 16 provides a shift pulse input to a polynomial generator 20.

A mode control matrix 21 is connected to receive inputs from the scan selector switch 17, the solid state memory 18, a mode selector switch 22, a toggle switch array 23 or a seven count sequence, special mode generator 24. The mode selector switch 22 selectively controls the input to the mode control matrix 21 in the form of the output from the solid state memory 18, the seven count sequence geneartor 24 or the toggle switch array 23.

The output from the mode control matrix 21 provides a multiple input signal to the polynomial generator 20 which operates in a manner which will be explained more fully hereinafter. The output of the polynomial generator is a series of related polynomial code sequences in two distinguishing states, usually in the form of a pulse or the lack of a pulse indicating a binary "1" or binary "0," which polynomial code sequences are connected to provide an input to gate 25. The gate 25, in turn, is connected to an output amplifier 26 which provides the modulation for the signal to be transmitted.

The scan selector switch 17 controls the frequencies to be scanned in a typical sounder system, while the incorrect count indicator 19 receives an input from the gate drivers 14 as well as from the one hundred and sixty address counter circuits 15 to verify the correct count of the input pulses. The incorrect count indicator 19 also receives an input from a transmit level amplifier 27 which, in addition, provides an input to the reset and set circuitry 28. The reset and set circuitry, in turn, provides its output to both the one hundred and sixty address counter circuits 15 and the seven count sequence generator 24, as well as the solid state memory 18, so that both these latter circuits may be set and reset in accordance with conventional binary practice. A static switch memory 18*a* may be employed to provide an input to the system through connection with the solid state memory 18.

Figures 2, 3A, 3B, 3C, 3D:
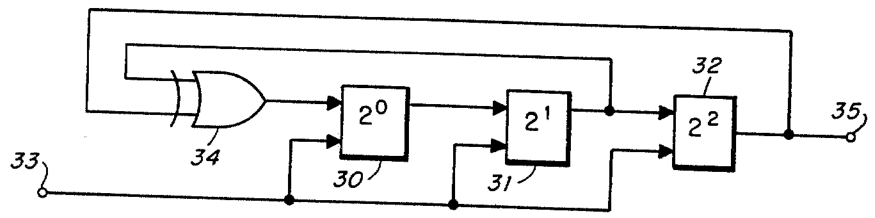

The polynomial generator 20, illustrated schematically in FIG. 1, may take the form of a binary shift register such as that illustrated in FIG. 2. The binary shift register illustrated in FIG. 2 is a three-bit type, the bits representing powers of the base "2," and more specifically $2^0$ as indicated at 30, $2^1$ as indicated at 31 and $2^2$ as indicated at 32. Shifting pulses are received at the input terminal 33 and connected to provide shifting inputs to all three bits as represented by elements 30, 31 and 32. The output of element 32 and the output of element 31 are both connected to provide inputs to an "exclusive-or" circuit 34. The output of circuit 34 is connected to provide one of the inputs to the $2^0$ bit circuit 30. In accordance with typical Boolean algebra terminology the "exclusive-or" circuit 34 operates so as to generate an output only when it receives an input from either bit element 31 or 32.

FIG. 3A illustrates octal code identifications in tabular form which are related to the respective adjacent binary bit code designators listed in tabular form in FIG. 3B. These latter code designators which will be recognizable as the octal code for the numbers listed in FIG. 3A are also related to respective binary bit elements 30, 31 and 32 of the polynomial generator illustrated in FIG. 2.

The code code designator signals are received in a polynomial generator 20 of FIG. 1 from the mode control matrix 21 which, in turn, has received such signals from either the solid state memory 18, the seven count sequence generator 24, or the toggle switch array 23. In accordance with the setting of the mode selector switch 22, the code designators signals as listed in FIG. 3B may be three bit form as is also illustrated and indicated by the three input lines connected from the mode control matrix 21 of FIG. 1 to the polynomial generator 20 of FIG. 1.

Thus, the code designator signals operate to establish the binary setting of the three elements 30, 31 and 32 of FIG. 2. Upon receiving a shift pulse, each such binary setting is shifted down the line to the next element or the output terminal as the case may be. The polynomial code sequence outputs in the form of seven bits comprising encoded words are tabularly litsed in FIG. 3C and indicate the output which appears sequentially at the polynomial code sequence generator terminal 35 from times $t_0$ through $t_{16}$. Thus, as an illustration, when the code designator signal is "111" as indicated at the top line of FIG. 3B (i.e. octal code 7) all the elements 30, 31 and 32 are set to binary "1"; therefore the output appearing at the output terminal 35 is a "1" at time $t_0$. Upon receiving a shift pulse at input terminal 33 all the binary information is shifted down the line so that the binary "1" which previously had been in element 31 appears in element 32 and at the output terminal 35. Thus, a binary "1" appears as the output of the polynomial code sequence generator at time $t_1$. The binary bit "1" in element 30 is shifted to element 31 so that element 30 becomes a binary "0." This is so because the "exclusive-or" circuit 34 does not operate to produce an output unless there is only one input appearing at either of its input terminals.

At time $t_2$ the binary "1" in element 31 is shifted into element 32 by the next shift pulse and appears at the output terminal 34, while the binary "0" in element 30 is shifted to element 31. Thus, element 32 will provide a binary "1" input to the "exclusive-or" circuit 34 at time $t_2$, while element 31 provides a binary "0" input to element 34. Accordingly, the exclusive-or circuit 34 will provide an output which is impressed upon element 30 and changes that binary "1" to a binary "0."

Upon the next shift pulse at time $t_3$ the binary "0" from element 31 is shifted into element 32 and appears at the polynomial code sequence output terminal 35. Under these conditions the binary "0" which is shifted from element 30 becomes the output signal of element 31 so that both elements 31 and 32 provide binary "0" outputs and the exclusive-or circuit 34 is not actuated. Therefore the element 30 returns to its normal binary "1" state.

Upon the next shift pulse at time $t_4$, the binary "0" condition of element 31 is shifted into element 32 and appears at the output of the polynomial code sequence generator at terminal 35. At time $t_4$, the output of element 32 is a binary "0," and the output of element 31 is a binary "1"; therefore, in accordance with its mode of operation, the exclusive-or circuit 34 is actuated to change the normal binary "1" state of element 30 to a binary "0."

At time $t_5$, the binary "1" in element 31 is shifted into element 32 by the next shift pulse and becomes the output of the polynomial code sequence generator appearing at terminal 35. At the same time, the "0" binary condition of element 30 is shifted into element 31.

With the next shift pulse time 56, the respective binary states of elements 30, 31 and 32 are shifted so that the binary "0" condition of element 31 which obtained at time $t_5$ is shifted into element 31 and appears at the output of the polynomial code sequence generator at terminal 35. This output completes the polynomial code sequence in binary form as indicated by the top line of FIG. 3C and the seven code element sequence "1110010" developed from times $t_0$ through $t_6$. The remaining polynomial code sequences as listed tabularly in FIG. 3C adjacent each of the respective code designators of 3B can similarly be verified through like operation of the three bit binary shift register illustrated in FIG. 2.

In accordance with one of the primary advantages of the present invention the plurality of polynomial code sequences developed in accordance with its concept provide the maximum number of code elements having distinguishable states relative to like or respective time intervals of the other plurality of polynomial code sequences, and as a function related to the number of elements in the code designator signals from which such plurality of polynomial code sequences are developed. The desirability of this operation is illustrated in FIG. 3D where the polynomial code sequence as developed from octal code 7 is compared with the polynomial code sequence developed from the octal code 4. By comparison, it will be seen that four code elements of each code sequence are clearly distinguishable from respective code elements and other code sequence. The same is true of the comparison of any of the plurality of polynomial code sequences illustrated in FIG. 3C with respect to any other of such plurality, i.e. they all have four distinguishable code elements in the seven code element sequence with respect to any other of the related code sequences. Thus, it is possible with the present invention to verify a particular polynomial code sequence by comparison techniques which may be carried out by an appropriate memory and comparison circuitry for verifying each code element received with the respective code element of stored code sequences. Accordingly, if transmission difficulties, attenuation, absorption or interference render a false indication of one code element, an appropriate correction can be made with assurance that the correct code sequence has been detected at the receiving end of the transmission.

Those skilled in the art will recognize that the present invention is not limited to the employment of a binary shift register nor is the concept limited in the number of elements which may be included in the development of a suitable plurality of polynomial code sequences. In fact, the employment of coded designator having N bits can be shown to develop $2^N-1$ polynomial code sequences, each sequence of which will have within it $2^N/2$ code elements which are distinguishable from the respective code elements appearing in like time elements of its related group or plurality of polynomial code sequences.

Thus a modulation system embodying the present invention provides a high degree of detectability of error in transmission, a multiple choice of modes of operation which vary from solid state memory storage to manually actuated switch means for selectively developing code designators signals which, in turn, control the generation of polynomial code sequences in groups of desirably related pluralities.

Obviously many modifications and variations of the present invention are possible in the light of the above teachings. It is therefore to be understood that the invention may be practiced otherwise than as specifically described.

What is claimed is:

1. A multi-frequency, pulse-encoded modulation system comprising:

means for receiving repetitive input pulses;

multiple address counters connected to receive said input pulses;

means connected to receive said pulses and the count output of said counters for verifying a correct count of said pulses;

selector means for determining a plurality of frequencies to be scanned;

means for developing a plurality of code designator signals in a selectively determinable order, said means being responsive to the output of said selector means for controlling the plurality of frequencies to be scanned;

a code generator responsive to input signals received from said code designator means for sequentially generating commensurate polynomial code sequences at each frequency of said plurality of frequencies, each sequence having a maximum number of code elements of distinguishable states for like time elements of each other polynomial code sequence and as a function of the total number of code elements common to such sequences; and means for modulating a transmission signal at each frequency of said plurality of frequencies in accordance with said plurality of polynomial code sequences and said distinguishable code element states.

2. A modulation system as claimed in claim 1 wherein said code designator means includes data storage memory means.

3. A modulation system as claimed in claim 1 wherein said code generator includes a binary shift register.

4. A modulation system as claimed in claim 1 wherein said code designator means is adapted to develop a plurality of octal code signals.

5. A modulation system as claimed in claim 1 wherein each code designator signal has "N" elements and each polynomial code sequence has $2^N-1$ elements.

6. A modulation system as claimed in claim 5 wherein each said polynomial code sequence has $2^N/2$ code elements of distinguishable state from like time elements of each other polynomial code sequence.

References Cited

UNITED STATES PATENTS

| | | | |
|---|---|---|---|
| 3,093,707 | 6/1963 | Nicholson et al. | 340—146.1 X |
| 3,114,130 | 12/1963 | Abramson | 340—146.1 |
| 3,373,404 | 3/1968 | Webb | 340—146.1 |
| 3,383,655 | 5/1968 | McRae | 340—146.1 |
| 3,384,873 | 5/1968 | Sharma | 340—146.1 |

MALCOLM A. MORRISON, Primary Examiner

CHARLES E. ATKINSON, Assistant Examiner

U.S. Cl. X.R.

325—67; 340—348